3,324,066
PROCESS FOR PREPARING INTERPOLYMER LATEXES BY INCREMENTAL MONOMER ADDITION
Marino Arcangeli and Lester A. Wise, Midland, Mich., assignors to The Dow Chemical Company, Midland, Mich., a corporation of Delaware
No Drawing. Filed Jan. 31, 1964, Ser. No. 341,730
18 Claims. (Cl. 260—29.7)

This invention relates to an improved process for preparing latexes of interpolymers. More particularly, it is concerned with the emulsion polymerization of monoalkenyl aromatic monomers, open-chain aliphatic conjugated dienes, and monoethylenically unsaturated carboxylic acids.

This application is a continuation-in-part of U.S. Ser. No. 139,891, now abandoned, filed Sept. 22, 1961.

It has been known for a considerable time that aqueous polymer latexes are particularly valuable vehicles to be used in the preparation of coating compositions. Exemplary of useful film-forming latexes are those of the copolymers of styrene and butadiene and equivalent monomers. Such synthetic latexes have been employed in a variety of coating applications. One of those applications where such latexes have found unusually good acceptance is as a binder for pigments in mineral coated paper. In that end use, the presence of the latexes has improved the printability of the paper to a significant extent. The prior known styrene/butadiene latexes, however, have not been without limitations. The mechanical and storage stability of the latexes, the binding power for the pigments, and other characteristics of the latexes have fallen far short of optimum. To improve some of the properties of the prior styrene/butadiene latexes, it has been suggested that small amounts of carboxylic acids be interpolymerized with those monomers. The resulting latexes have exhibited improved pigment binding power and mechanical stability. However, when prepared by conventional emulsion polymerization procedures, the latexes have been characterized by a disagreeable odor and an undesirable high viscosity at alkaline pH and when blended with pigment slips. In addition, in the preparation of latexes by the prior batchwise techniques the polymerization temperature has frequently been difficult to control resulting in poor reproducibility of latex product from batch to batch. In not infrequent cases, the polymerization has become what is popularly referred to as a runaway (i.e., where the heat generated by the exothermic polymerization reaction exceeds the heat transfer capacity of the polymerization equipment). As a consequence, it would be desirable if film-forming latexes to be used in paper coating, such as those of styrene/butadiene, could be improved upon as to overcome those shortcomings. It would be equally desirable to have an improved polymerization process for preparing such latexes whereby more effective control of the polymerization temperature could be realized.

It is the principal object of this invention to provide an improved process for the preparation of synthetic latexes.

It is a further object to provide such a process for emulsion polymerizing a monovinyl aromatic monomer, an open-chain conjugated diene, and a mono-ethylenically unsaturated carboxylic acid.

The above and related objects are achieved in the process wherein a monomeric mixture consisting of from 1 to 10 percent of at least one monoethylenically unsaturated carboxylic acid, with the remainder being a mixture of an open-chain aliphatic conjugated diene having from 4 to 9 carbon atoms and a monoalkenyl aromatic monomer having an aromatic nucleus containing from 6 to 10 carbon atoms, is polymerized in aqueous emulsion using a water-soluble polymerization catalyst, by the improvement which comprises: forming an aqueous dispersion of an initial monomeric increment comprising at least a portion of the total amount of the carboxylic acid monomeric component and at least a portion of the conjugated diene, maintaining the dispersion under non-polymerizing conditions while agitated until the monomers of said monomeric increment are intimately admixed, thereafter subjecting the dispersion to catalytic and thermal conditions sufficient to induce polymerization and then adding the remainder of the conjugated diene and aromatic monomers incrementally, i.e., continuously or shot-wise, to said dispersion followed by the introduction of the remainder of said carboxylic monomer, and finally maintaining the dispersion under conditions of thermal and catalytic polymerization inducement until polymerization is substantially complete.

The monomeric materials which are useful in the improved process of this invention comprise a monoalkenyl aromatic monomer, an open-chain aliphatic conjugated diene, and a monoethylenically unsaturated carboxylic acid. By the term "monoalkenyl aromatic monomer" it is intended to include those monomers wherein an alkenyl group is attached directly to an aromatic nucleus containing from 6 to 10 carbon atoms. Those monomers may include alkyl- or halo-substituted compounds. Typical of these monomers are styrene, p-methylstyrene, methylstyrene, o,p-dimethylstyrene, o,p-diethylstyrene, p-chlorostyrene, isopropylstyrene, tert.-butylstyrene, o-methyl-p-isopropylstyrene, and o,p-dichlorostyrene. The term is also intended to include comonomeric mixtures of styrene with α-methylstyrene or one of the above-named monomers. Because of their availability and their ability to produce desirable polymers and for other reasons, it is preferred to use styrene and vinyl toluene as the monoalkenyl aromatic monomer.

By the term "open-chain aliphatic conjugated diene" it is meant to include, typically, butadine-1,3, 2-methylbutadiene-1,3, 2,3-dimethylbutadiene-1,3, piperylene, 2-neopentylbutadiene-1,3, and other hydrocarbon homologs of butadiene-1,3, and, in addition, the substituted dienes, such as 2-chlorobutadiene-1,3, 2-cyanobutadiene-1,3, the substituted straight-chain conjugated pentadienes, the straight- and branch-chain hexadienes, and others. The butadiene-1,3 hydrocarbons and butadiene-1,3 specifically, because of their ability to produce particularly desirable polymeric materials, are preferred comonomers for use with the monoalkenyl aromatic monomer.

The monoethylenically unsaturated carboxylic acids include any of those copolymerizable with the aforementioned monomers. Exemplary of such acids are acrylic acid, fumaric acid, methacrylic acid, and itaconic acid. Combinations of two or more such acids are equally operable in this process. The carboxylic acid may be added in its free acid form or in a partially neutralized form, or may be converted at least in part to a salt while in aqueous dispersion.

The monomers which are polymerized by the present process include an open-chain conjugated diene, a monoalkenyl aromatic monomer and from 1 to 10 percent by weight of the total weight of monomers of a monoethylenically unsaturated carboxylic acid. Although the proportions of the monomers may be varied within wide limits, it has been found that an advantageous range of monomer ratios is from about 3 to 90 percent by weight of the diene, from 1 to 10 percent by weight of the acidic monomer, with the remainder including at least 5 percent by weight of the aromatic monomer. Amounts of the carboxylic acid monomer less than about 1 percent are generally insufficient to provide the desired pigment binding power in formulations used for coating paper and the like, and, additionally, do not provide latexes having the desired resistance to coagulation caused by shear and/or the presence of cations. With more than about 10 percent acidic monomer, there is no corresponding increase in pigment binding or other properties and the polymeric materials tend to be more corrosive. When the amount of the other monomers falls appreciably outside of the advantageous range mentioned earlier, the polymer properties tend to become either too hard or too soft for most practical coating or flexible foam producing applications.

Latexes obtained by the present invention are often particularly useful in coatings applications, such as paper and textile coatings and the like. In this regard, it has been found that highly desirable film properties are obtained from latexes prepared by the method of the present invention utilizing a monomer mixture consisting essentially of from 1 to about 10 percent of the defined monoethylenically unsaturated carboxylic acid constituent, from about 36 to 47 percent of the open-chain aliphatic conjugated diene and the remainder being the monoalkenyl aromatic monomer.

It is pointed out, however, that not all of the latexes prepared by the present invention are film forming per se, but may advantageously be blended with other film-forming materials for the obtainment of improved properties and, additionally, may often be advantageously used in the preparation of vinyl foams.

As mentioned, the present invention resides in the area of emulsion polymerization. As is known in this field, the preparation of a polymer latex employs many different non-polymerizable components whose functions to great extent are interdependent. The invention contemplates the use of these prior known non-polymerizable components employed in emulsion polymerization technology. Thus, the aqueous dispersion may include buffers, accelerators, chelating agents, stabilizers, emulsifiers and similar ingredients.

Emulsifiers selected from the anionic class of such materials are often advantageously added to the aqueous dispersion to reduce polymerization cycle time and/or to provide particle size control. This class of materials is well known and includes, typically, the alkyl aryl sulfonates, the alkali metal alkyl sulfates, the soaps, and the like. Representative of useful species is an alkali metal alkyl sulfate sold commercially as Duponol WAQ. Other useful emulsifying agents include a dihexyl ester of sodium sulfosuccinic acid sold commercially as Aerosol MA by the American Cyanamid Company and an alkyl aryl sulfonate sold commercially as Nacconol NRSF by the Allied Chemical Corp. Other species of useful anionic emulsifying agents will be known. Combinations of two or more of those emulsifying agents may be employed if desired for special effects.

The catalysts that are commonly and traditionally employed in emulsion polymerization are the water-soluble per-compounds and other compounds of similar decomposition mechanism. Typical of the useful water-soluble catalysts are hydrogen peroxide, potassium persulfate, and the like. If desired, however, the other known catalysts, including the complex catalysts, such as the so-called redox catalytic systems consisting of a combination of oxidizing agent and reducing agent, may also be used.

It is often preferable to the attainment of optimum copolymer properties that a chain-transfer agent be present. Typical of such chain-transfer agents are lauryl mercaptan, t-dodecyl mercaptan, carbon tetrachloride, and diisopropyl dixanthogen. Other useful chain-transfer agents will be known. It is also possible to employ combinations and mixtures of such chain-transfer agents. The concentration of the chain-transfer agent will vary with the efficiency of the specific agent used and to a lesser extent with the amount of conjugated diene present. The optimum amount in any case is that minimum necessary to attain the desired latex product. That optimum concentration is readily determined by simple preliminary experiment.

The process of the present invention is an emulsion polymerization procedure involving a unique order of monomer addition and a certain sequence of particular polymerization conditions. Only when the process is followed literally are the stated objectives realized. In the process, an aqueous dispersion of an initial monomeric increment comprising at least a portion of the carboxylic acid monomer and a portion of the non-acidic monomers is prepared and held under non-polymerizing conditions until intimately admixed. The dispersion is preferably continuously agitated for at least 5 minutes under such non-polymerizing conditions. After that period of time, the dispersion is subjected to catalytic and thermal conditions known to induce polymerization and the remainder of the conjugated diene and the monoalkenyl aromatic monomer are incrementally added. Any remainder of the acidic monomer is then added, but not before at least substantially all the diene and the aromatic monomers have been introduced; polymerization is then carried to completion.

It is generally accepted in emulsion polymerization technology that agitation is required to form the dispersion initially and to maintain the dispersion throughout polymerization. The rate of agitation to be used in any particular instance will be dependent primarily on the overall design of the polymerization equipment. The minimum amount of agitation required to form and to maintain the dispersion is usually to be desired.

The invention requires that the initial increment of monomers present in the initial dispersion be thoroughly mixed before any polymerization commences. This can be most practically achieved by cōntrol of temperature and of catalyst addition. When the catalyst is included in the initial aqueous dispersion, it is necessary to maintain the temperature of the dispersion below about 30° C. until the desired mixing has been achieved. After mixing, the temperature can be raised to the desired polymerization temperature. As a general guide, when this technique is to be used, the agitation of the aqueous dispersion, including the initial increment of monomers, should be maintained at under about 30° C. for at least 5 minutes to assure thorough and intimate mixing of the monomers. The use of a higher temperature than about 30° C. results in the preparation of a generally unstable, unsatisfactory polymer latex. The indicated temperature of less than 30° C. may be maintained for up to 30 minutes or longer, although no additional benefits accrue from periods greater than 30 minutes. Preferably, the dispersion, including the initial increment of monomers, should be maintained while agitated at less than 30° C. for at least 15 minutes.

An alternate procedure to maintain the required non-polymerization conditions until admixture of the initial increment is achieved is to withhold the catalyst until the mixing of the initial dispersion has been completed. This technique permits the use of higher temperatures during mixing and precludes the need for refrigeration.

As noted, the invention utilizes an initial increment of the monomers followed by a sequential addition of the remaining monomers. The initial increment must include at least a part of the acidic monomer and at least a part of the diene. It is not absolutely necessary that the initial increment contain aromatic monomer, although to prepare polymers high in aromatic monomer content, there will usually be some of the latter present in that initial increment.

When from 1 to 3 percent of acidic monomer is employed, the acidic monomer is added in two portions, one in the initial dispersion, the other after the addition of the non-acidic monomers. In this regard, it is preferred that the withheld portion of acidic monomers is introduced at a point where from about 80 to 95 percent of the non-acidic monomers have been converted to polymer.

The initial increment of conjugated diene and monoalkenyl aromatic monomers added to the aqueous phase should be at least about 5 percent and preferably from about 10 to 20 percent of the total amount of those monomers to be added. Lesser or greater amounts of those monomers added as initial increment change the character of the polymer formed.

The addition of the conjugated diene and monoalkenyl aromatic monomer subsequent to the initial increment of those monomers can be at any practical rate and can be either incremental or continuous addition. It is generally not necessary to wait until the final polymerization temperature has been reached. As is known, with polymerization vessels of large capacity there is a long time period involved in raising the temperature from about 30° to about 60° C. or higher. The subsequent addition of monomers can usually be started well in advance of attainment of the ultimate polymerization temperature and while the temperature is rising. However, in those recipes employing relatively small amounts of carboxylic acid monomer (about 1 to 3 percent) it is beneficial to withhold introduction of the subsequent amounts of the conjugated diene and monoalkenyl aromatic monomer until the initial dispersion has reached the polymerization temperature and may be delayed for about 30 minutes after reaching that temperature.

In the preparation of the present latexes, the polymerization temperature should be above 50° C. and preferably should fall in the range of from 70° C. to 80° C. The use of lower temperatures gives rise to longer polymerization cycles. Higher temperatures than about 80° C. present difficulties in the polymerization due to the increased pressure of volatile ingredients, such as butadiene. It is one of the advantages of the invention that higher polymerization temperatures may be used with excellent control compared to the prior batchwise techniques wherein all ingredients are charged into the vessel prior to polymerization.

For coatings compositions, it is desirable to have latexes having polymer solids within the range of from about 20 to 55 percent by weight. When there is significantly less than about 20 percent solids, it is difficult to attain continuous, coherent films by simple disposition and drying. Furthermore, latexes having appreciably less than about 20 percent solids are uneconomical to prepare. Latexes containing appreciably more than 55 percent solids are difficult to prepare and when made are likely to be unduly sensitive to mechanical shearing forces. However, the present invention is not limited to any given amount of solids content.

As is known, many latex properties are dependent upon the particle size of the polymer. The present invention is operable with latexes of any useful particle size.

The latexes resulting from the process of this invention may be formulated with the conventional and common additives, such as pigments, dyes, fillers, stabilizers, preservatives, thickeners, and the like, which are commonly incorporated in paints, adhesives, and similar compositions. The latexes may be blended with other known latexes if desired. Frequently it is desirable to post stabilize the latexes by incorporating therein small but significant amounts of wetting agents which may be the same as or different from the emulsifiers used in preparing the latexes.

Furthermore, the latexes resulting from the process of this invention are characterized by a substantial reduction in disagreeable odor over those prepared by prior processes. The process of this invention permits polymerization of the monomeric ingredients in larger vessels and at higher temperatures than conventional batchwise polymerization. The present process minimizes runaway polymerizations and hot spots and provides better temperature control with a consequently more uniform product from batch to batch.

The operation of the process, as well as the benefits and advantages that accrue therefrom, will be illustrated by the following examples. In the examples all parts and percentages are by weight.

Example 1

A latex, prepared in accordance with this invention, was made of the following ingredients: 52.8 parts styrene, 43.2 parts butadiene, 3 parts itaconic acid, and 1 part acrylic acid as monomers. The non-polymerizable components consisted of 92 parts demineralized water, 1 part carbon tetrachloride, 1 part potassium persulfate, 1 part of an alkali metal alkyl sulfate sold commercially as Duponol WAQ, and 0.9 part of a dioctyl ester of sodium sulfosuccinic acid sold commercially as Aerosol OT.

The polymerization procedure was as follows: 88 parts of the water were added to the reactor which was then heated to about 50° C. The potassium persulfate was added and when in solution this aqueous phase was cooled to about 30° C. All of the Aerosol OT, about 0.15 part of the Duponol WAQ, all of the carbon tetrachloride, and all of the acrylic acid and itaconic acid were then added. The polymerization vessel was sealed and purged twice with nitrogen. Sixteen parts of premixed styrene/butadiene monomers were then added and the dispersion agitated for 15 minutes without increasing the temperature over 30° C. The dispersion was then heated to about 75° C. When the temperature reached about 50° C. during the heatup period, the remaining 80 parts of premixed styrene/butadiene monomers were added continuously at about 13 parts per hour. After all of the monomers had been added, the remaining amount of Duponol WAQ diluted in 4 parts of water was incorporated. Polymerization was continued at about 75° C. until substantially completed in about 12 hours.

The product of the above polymerization was a stable latex, free of precoagulum, with a non-volatile content of about 50 percent, and with latex particles having an average size of between 1700 to 1900 angstrom units. An air-dried film of about 0.01 inch in thickness was continuous, clear, and slightly tacky. This latex product which represents the process of this invention is identified hereinafter as Composition A.

By way of contrast, several latexes were prepared by modifying the above procedure. In one such comparative embodiment, the aqueous phase was maintained at about 50° C. for the introduction of the carboxylic acid monomers and was held at this temperature after introduction of the initial increment of 16 parts of styrene/butadiene monomers for 10 minutes. In all other respects the ingredients and procedure were identical to the aforementioned run. The latex resulting from this invention is identified as Composition B.

The preparation of Composition B was repeated except that a mixing time of 15 minutes instead of 10 minutes following the introduction of the initial increment of styrene/butadiene monomers was used. This composition is identified as Composition C.

In a further contrasting vein, the procedure for making Composition A was modified in that the temperature used for introducing the carboxylic monomers and the initial increment of styrene/butadiene monomers was 30° C. Immediately following (zero minutes) addition of the initial increment of styrene/butadiene monomers, the temperature was raised to the polymerization temperature. This product is identified as Composition D.

For purposes of testing to be described subsequently, a latex of similar ingredients in similar proportions prepared by a conventional batchwise polymerization technique was prepared. This conventional latex product has heretofore been accepted as having very high adhesion and superior properties as a paper coating pigment binding vehicle. This latex product will be identified hereinafter as the control latex.

In summary, Composition A identifies one embodiment of the process of this invention, Compositions B through D identify contrasting modifications of the process which are outside of the scope of this invention, and the control latex is a paper coating composition accepted as having superior paper coating properties.

A pigment dispersion of clay coating colors was mixed into samples of each latex. In one sample of each latex the ratio was 100 parts of pigment solids to 10.5 parts of latex solids. Into another sample of each latex the ratio was 100 parts pigment solids to 15 parts latex solids. Each of the blended dispersions was applied to bleached sulfite paper with a wire wound rod and air dried 24 hours. The pigment binding was determined with a Warren Print Tester wherein a coated paper is taped to a metal plate and an inked cylinder brought into contact with the coated paper at increasing velocities until a velocity is reached where the ink will partially remove the coating from the paper. The results of this test are known in the art as the dry pick resistance of a paper coating. In this test, it is necessary that a control be run with each determination. Thus, it is the relative value between the specimen to be tested and its control for each single test that is of significance. In the tests with the formulation using Composition A, that formulation showed a dry pick resistance of 261 feet per minute whereas the control was 258 feet per minute. The formulation using Composition B exhibited 243 feet per minute whereas the control showed 309 feet per minute. The Composition C formulation gave 143 feet per minute whereas the control was 207 feet per minute. The Composition D formulation showed 218 feet per minute against 254 feet per minute for the control. Similar results were shown with formulations using 15 parts of polymer per 100 parts of pigment slip. From the results, it can be seen that Composition A was equal to or superior to the control latex while Compositions B, C, and D were substantially below the control in each instance.

*Example 2*

A latex was prepared in accordance with this invention from the following recipe: 58 parts styrene, 42 parts butadiene, 1.5 parts acrylic acid, and 0.5 part fumaric acid as the monomers. The non-polymerizable components consisted of 100 parts demineralized water, 1 part carbon tetrachloride, 1.32 parts potassium persulfate, and 1.2 parts of the dihexyl ester of sodium sulfosuccinic acid sold commercially as Aerosol MA. The polymerization procedure followed was to add all of the water to the reactor and heat the same to 50° C. The potassium persulfate was added and when in solution the aqueous phase was cooled to 30° C. The emulsifier was added, two-thirds of the total amount of acrylic acid that was to be used was added, all of the fumaric acid, and all of the carbon tetrachloride were added. The polymerization vessel was sealed and purged twice with nitrogen. Sixteen parts of the premixed styrene/butadiene monomers were added and the emulsion agitated for 15 minutes. The dispersion was heated to 70° C. When the temperature reached 50° C. during the heatup, the remaining styrene/butadiene monomers were added continuously at about 12 parts per hour. As soon as the continuous portion of the styrene/butadiene monomers had been added, the remaining one-third of the acrylic acid was introduced in a single increment. Polymerization was carried to substantial completion with the dispersion agitated at 70° C. The product of this polymerization was a stable latex, relatively free of precoagulum, having a non-volatile content of about 50 percent. The latex particles were of an average size of 1700 to 1900 angstrom units. When the latex was neutralized to a pH of 7, it remained fluid and did not thicken significantly. An air-dried film of about 0.01 inch in thickness was continuous, clear, and slightly tacky. This composition will be identified hereinafter as Composition E.

In a further embodiment of the invention, the process of Example 2 was repeated wherein the acidic monomers consisted of 1.5 parts of acrylic acid. Of that amount, 0.75 part was added in the initial introduction of monomers and 0.75 part added following the introduction of the styrene/butadiene monomers. This composition will be identified hereinafter as Composition F.

Each of the latexes was evaluated in a high shear roll stability test. In that test a given amount of latex is poured into the nip of a two-roll mill wherein one roll is steel and one is rubber. The latex is recirculated back into the nip. Failure of the latex is observed by a plating out of the polymer on the rolls. In such a test, the commercial film-forming styrene/butadiene latexes (without carboxylic acid monomers) generally fail in from about 2 to 3 minutes. The prior known styrene/butadiene latexes containing carboxylic acid monomer when prepared by conventional batchwise polymerization will withstand 15 or more minutes before failure. When tested according to the aforementioned high shear roll stability test, it was found that the latexes of this invention were equal or superior to the previously mentioned styrene/butadiene latexes as prepared by conventional batch polymerization techniques; and, further were found to be equivalent to such previously mentioned styrene/butadiene latexes when tested for dry pick resistance by the procedures as generally described in Example 1.

Also, the latexes of this Example 2 when raised to a given alkaline pH exhibited about one-half the viscosity of the control latex of Example 1 raised to the same pH. A corresponding viscosity relation was observed between the pigmented latexes of this example and that control latex.

*Example 3*

By the general procedure of the preceding examples, a latex was prepared from a monomer mixture consisting of 88.87 parts styrene, 9.87 parts butadiene, 1 part acrylic acid, and 0.25 part fumaric acid. The initial increment of monomers added to the aqueous phase consisted of 13 parts of a mixture consisting of 90 percent styrene and 10 percent butadiene and to this was added half of the acrylic acid and all of the fumaric acid. The monomers were polymerized for about one hour at 70° C. at which point the remaining styrene/butadiene monomers were added at a continuous stream at a rate to require 12 hours for the addition. At this point, the remaining half of the acrylic acid was added and the reaction carried to completion. The latex was found to be useful for coating paper to be used in office copying paper application.

*Example 4*

By the general procedures of the preceding examples, a latex was made from 78 parts styrene, 20 parts butadiene, and 2 parts acrylic acid. The initial dispersion contained about 13 parts of the styrene and butadiene in the ratio of 80 percent styrene to 20 percent butadiene, and one and one-half parts acrylic acid. After the thorough mixing, the monomers were reacted about 30 minutes at 70° C. at which point the remaining styrene/butadiene monomers were added as a continuous stream at a rate to require 7 hours. Following that addition, the remaining acrylic acid was added and the reaction carried to completion. The latex could be blended with softer copolymers to impart stiffness thereto. The latex of this example was useful in rug backing adhesive formulations.

*Example 5*

A latex was prepared from 42 parts styrene, 56 parts butadiene, 1.75 parts acrylic acid, and 0.25 part fumaric acid by the general procedures of the preceding examples. The initial increment was made up of about 16 parts of the styrene and butadiene in the ratio of 60 percent styrene to 40 percent butadiene. Five-tenths part acrylic acid and 0.25 part fumaric acid were also added initially. After thorough mixing, these monomers were reacted for about 0.5 hour at 70° C. at which point the remaining styrene/butadiene monomers were added continuously at a rate to require 7 hours. The remaining 1.25 parts acrylic acid was then added and the reaction allowed to finish. This latex was useful as a rug backing adhesive formulation.

*Example 6*

A latex was prepared from 57 parts styrene, 41 parts butadiene, 1.75 parts acrylic acid, and 0.25 part fumaric acid utilizing the general procedures of the preceding examples, but wherein the initial increment of monomers (comprising about 16 parts of the styrene and butadiene in the ratio of 60 percent styrene to 40 percent butadiene, all of the fumaric acid and about one-third of the acrylic acid) was mixed as the initial dispersion at 50° C. in the absence of catalyst. After the thorough mixing, the catalyst was added and the monomers reacted for about 0.5 hour at 70° C. at which point the remaining styrene/butadiene monomers were added continuously at a rate to require 8 hours. The remaining two-thirds of the acrylic acid was then added and the reaction allowed to finish. This latex was found to be comparable in paper coating properties to a similar latex prepared by adding the catalyst in the initial dispersion followed by agitation of the same for a period of 0.5 hour at 30° C. Further, the product of the herein described polymerization was a stable latex, free of precoagulum, with a non-volatile content of about 50 percent, and with latex particles having an average size of between 1700 to 1900 angstrom units. An air-dried film of about 0.01 inch in thickness was continuous, clear, and slightly tacky.

In addition to the advantages noted in the preceding examples, all of the indicated latexes of this invention exhibited substantially less odor than the control latex of Example 1. Still further, the preparation of the latexes of this invention in commercial latex production equipment was characterized by no runaway polymerizations and by better temperature control than the preparation of the control latex in the same equipment.

What is claimed is:

1. In the process wherein a monomeric mixture consisting of from 1 to 10 percent of at least one monoethylenically unsaturated carboxylic acid, from 3 to 90 percent by weight of an open-chain aliphatic conjugated diene having from 4 to 9 carbon atoms and the remainder of at least 5 percent by weight of a monoalkenyl aromatic monomer having an aromatic nucleus containing from 6 to 10 carbon atoms is polymerized in aqueous emulsion using a water-soluble polymerization catalyst, the improvement which comprises: forming an aqueous dispersion of an initial monomeric increment of from about 5 to about 20 weight percent of the total amount of monomers, said increment comprising at least a portion of the total amount of the carboxylic acid monomeric component and at least a portion of the conjugated diene, maintaining said dispersion under non-polymerizing conditions while agitated until the monomers of said dispersion are intimately admixed, said non-polymerizing conditions being a temperature below about 30° C. or an absence of a polymerization catalyst, thereafter subjecting said dispersion to catalytic and thermal conditions of from about 50 to 80° C. sufficient to induce polymerization and then adding incrementally at a rate of from about 8 to 16 percent per hour of the remainder of the conjugated diene and aromatic monomers to said dispersion followed by the introduction of any remainder of said carboxylic monomer, and finally maintaining said dispersion under conditions of thermal and catalytic polymerization inducement until polymerization is substantially complete.

2. The process claimed in claim 1 wherein an emulsifier is included in the dispersion of polymerizable ingredients.

3. The process claimed in claim 1 wherein a chain-transfer agent is included in the dispersion of polymerizable ingredients.

4. The process claimed in claim 3 wherein said chain-transfer agent is carbon tetrachloride.

5. The process claimed in claim 1 wherein said water-soluble polymerization catalyst is included in said aqueous dispersion of the initial monomeric increment and said dispersion is maintained at a temperature less than about 30° C. while agitated for at least about 5 minutes until intimately admixed.

6. The process claimed in claim 1 wherein said aqueous dispersion is maintained while agitated at a temperature up to the final polymerization temperature until intimately admixed and thereafter adding said water-soluble polymerization catalyst.

7. The process claimed in claim 1 wherein said initial monomeric increment contains at least about 5 percent of the total amount of the conjugated diene and monoalkenyl aromatic monomer to be polymerized.

8. The process claimed in claim 1 wherein said polymerization temperature is from about 50 to about 80° C.

9. The process claimed in claim 1 wherein said monoalkenyl aromatic monomer is styrene.

10. The process claimed in claim 1 wherein said conjugated diene is butadiene.

11. The process claimed in claim 1 wherein said carboxylic acid monomer is acrylic acid.

12. The process claimed in claim 1 wherein the acidic monomer is a combination of acrylic acid and itaconic acid.

13. The process claimed in claim 1 wherein the acidic monomer is a combination of acrylic acid and fumaric acid.

14. The process claimed in claim 1 wherein the total amount of carboxylic acid monomeric component is added in said initial monomeric increment.

15. The process claimed in claim 1 wherein a portion of said acidic monomer is added in said initial monomeric increment and the remainder of said acidic monomer is introduced following the addition of substantially all of said conjugated diene and said monoalkenyl aromatic monomers.

16. In the process wherein a monomeric mixture consisting of from 1 to 3 percent of at least one monoethylenically unsaturated carboxylic acid, from 3 to 90 percent by weight of an open-chain aliphatic conjugated diene having from 4 to 9 carbon atoms, and the remainder of at least 5 percent by weight of a monoalkenyl aromatic monomer having an aromatic nucleus containing from 6 to 10 carbon atoms is polymerized in aqueous emulsion using a water-soluble polymerization catalyst, the improvement which comprises: forming an aqueous dispersion of an initial monomeric increment comprising a first portion of the carboxylic acid monomeric component and at least a portion of the conjugated diene, maintaining the dispersion under non-polymerizing conditions while agitated until the monomers of said monomeric increment are intimately admixed, thereafter subjecting said dispersion to catalytic and thermal conditions sufficient to induce polymerization and then adding the remainder of the conjugated diene and aromatic monomers incrementally to said dispersion followed by the introduction of the remainder of said carboxylic acid monomer, and finally maintaining said dispersion under conditions of thermal and catalytic polymerization inducement until polymerization is substantially complete.

17. The process claimed in claim 16 wherein the remainder of said carboxylic acid monomer is added at a point where from about 80 to 95 percent of the non-acidic monomers have been converted to polymer.

18. An aqueous latex having from about 20 to about 55 percent polymer solids and prepared by the process claimed in claim 1.

References Cited
UNITED STATES PATENTS

| | | | |
|---|---|---|---|
| 2,698,318 | 12/1954 | Brown | 260—80.7 |
| 2,724,707 | 11/1955 | Brown | 260—29.7 |
| 2,880,189 | 3/1959 | Miller et al. | 260—29.7 |

MURRAY TILLMAN, *Primary Examiner.*

J. ZIEGLER, *Assistant Examiner.*